United States Patent
Korengel et al.

(10) Patent No.: US 7,169,420 B2
(45) Date of Patent: Jan. 30, 2007

(54) POST-FILING HEAT DWELL FOR SMALL-SIZED HOT FILLED JUICE BEVERAGE CONTAINERS

(75) Inventors: Jeff Korengel, Sarasota, FL (US); Kapil B. Gami, Bradenton, FL (US); Todd Brueck, Bradenton, FL (US); Tammy Svoboda, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 703 days.

(21) Appl. No.: 10/338,417

(22) Filed: Jan. 8, 2003

(65) Prior Publication Data

US 2004/0131735 A1    Jul. 8, 2004

(51) Int. Cl.
*A23L 1/212* (2006.01)
*A23L 2/00* (2006.01)

(52) U.S. Cl. .............. 426/115; 426/397; 426/399; 426/401; 426/407

(58) Field of Classification Search .............. 426/115, 426/397, 399, 401, 407; 53/127, 440
See application file for complete search history.

(56) References Cited

U.S. PATENT DOCUMENTS

| | | | |
|---|---|---|---|
| 2,561,784 A * | 7/1951 | Garcia | 426/397 |
| 2,748,005 A | 5/1956 | Baler | |
| 2,846,316 A | 8/1958 | Crespo et al. | |
| 3,476,574 A | 11/1969 | Schack et al. | |
| 3,846,570 A * | 11/1974 | Vetter et al. | 426/399 |
| 4,497,855 A * | 2/1985 | Agrawal et al. | 428/36.92 |
| 5,251,424 A * | 10/1993 | Zenger et al. | 53/431 |
| 5,309,827 A | 5/1994 | Manser et al. | |
| 5,797,436 A | 8/1998 | Phallen et al. | |
| 5,865,010 A | 2/1999 | Sundby et al. | |
| 5,896,727 A | 4/1999 | Egli et al. | |
| 5,968,451 A | 10/1999 | Iwamoto et al. | |
| 6,374,575 B1 * | 4/2002 | Strohn et al. | 53/288 |
| 2002/0004090 A1 * | 1/2002 | Lafleur | 426/401 |

FOREIGN PATENT DOCUMENTS

| | | | |
|---|---|---|---|
| AU | 2298901 | | 5/2002 |
| CA | 2431894 | | 5/2002 |
| DE | 29605881 | U1 * | 6/1996 |
| DE | 19520925 | A1 * | 12/1996 |
| EP | 0812547 | | 12/1997 |

(Continued)

OTHER PUBLICATIONS

Barbara M. Lund, et al., "The Microbiological Safety and Quality of Food", vol. 1, pp. 59-63, 2000.

*Primary Examiner*—Helen Pratt
(74) *Attorney, Agent, or Firm*—Banner & Witcoff, Ltd.

(57) ABSTRACT

A method and system incorporates a warming tunnel closely downstream of a hot filling apparatus which is set up to fill relatively small volume capacity polymeric containers of not greater than 12 fluid ounces. The hot filled containers are conveyed through a warming tunnel which provides a heated environment which is higher in temperature than the environment, thereby maintaining the temperature of the beverage within the containers at an adequate temperature for an adequate time so as to complete needed heat treatment of the beverage in each such small container.

16 Claims, 1 Drawing Sheet

FOREIGN PATENT DOCUMENTS

| | | |
|---|---|---|
| EP | 1335649 | 8/2003 |
| GB | 464568 | 4/1937 |
| GB | 2322785 | 9/1998 |
| JP | 10001118 | 1/1998 |
| WO | WO 0234059 | 5/2002 |

* cited by examiner

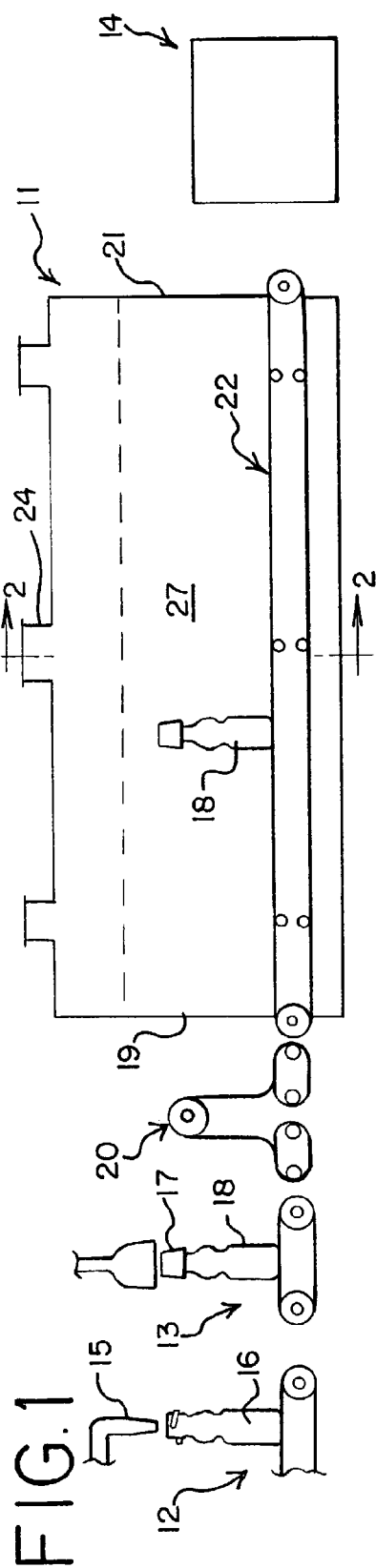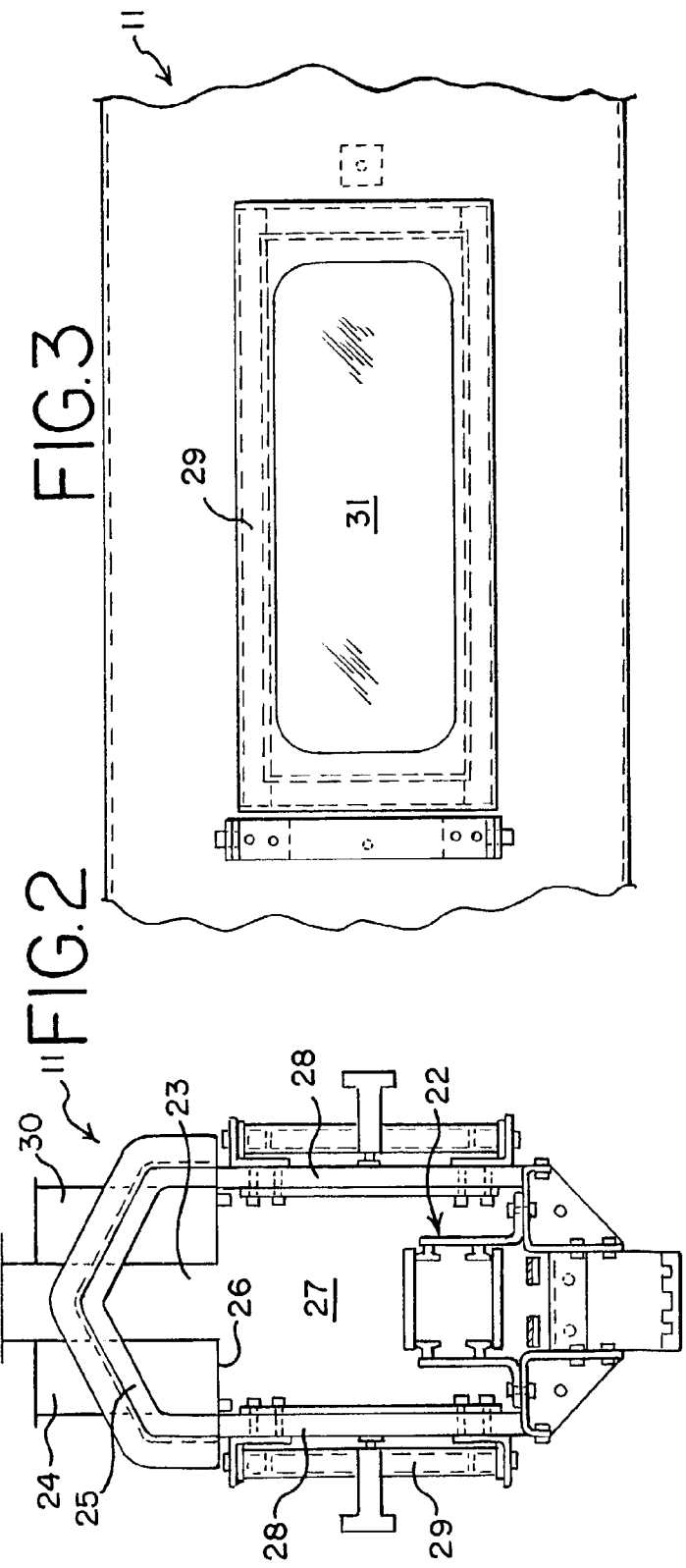

POST-FILING HEAT DWELL FOR SMALL-SIZED HOT FILLED JUICE BEVERAGE CONTAINERS

BACKGROUND OF THE INVENTION

1. Field of the Invention

This invention relates to technology by which juice beverages are hot filled into small-sized polymeric containers. More particularly, the invention relates to hot filling of juices into individual-serving sized polymeric containers and ensuring beverage wholesomeness through the use of a post-filling heat dwell procedure. The invention has special application for citrus beverages.

2. Description of Related Art

A wide variety of food products are packaged by so-called hot filling of the food product into a polymeric container which then is capped and allowed to cool to a product which can be subjected to shelf storage at ambient temperatures. Certain hot-filled food products are of a so-called high-acid type, typically meaning that the product has a pH of less than 4.6. In general, the hot filling of products has the benefit of raising the temperature of the food product being filled, as well as of the portions of the container being filled which are contacted by the heated food product. Being thus contacted by the heated food has the benefit of addressing the need for aseptic or sterile filling.

For example, hot-filled food products and beverages with a pH of less than 4.6 are heated in continuous systems for effecting microbial control for the particular food or beverage. The relatively low pH helps to control microbial growth, which is useful in combination with heating and contacting with heated materials to help control microbial growth in the bottled product. Usually such processes are adequate to provide a wholesome product for an extended shelf life at ambient temperature. For such products, storage under refrigerated conditions is not essential for providing a product with extended shelf life.

When the food product is a citrus juice beverage, particular problems surface due to the solids content of citrus juices. This is especially the case for citrus juice beverages which are 100% citrus juice. Beside such whole juice products, beverages containing a substantial percentage of citrus juice encounter similar problems. In a typical filling system for a beverage that is not particularly natural or viscous, so-called flood filling techniques are used. By these techniques, the beverage is filled very close to the top of the container, over filling it in some circumstances. Because such products are not particularly viscous or highly solids containing, there is little concern if some of the beverage flows over or splashes onto the outside of the bottles when the containers are moved prior to capping.

This flood filing approach is not a viable option for the type of products filled according to the invention. With such products, overfilled or splashed out beverage leaves a solid residue that turns into an unsightly and a potentially unsanitary residue on the outside of the container. This difficulty is compounded when the bottles being filled have a low-volume capacity, such as 12 fluid oz. or less. If a typical small-volume container is filled close to its top sealing surface (TSS), centrifugal forces when the bottles move on the bottle handling line will tend to spill the contents out of the relatively small bottles. This creates a potential need to have the hot product as close as possible to the TSS for aseptic reasons, but spaced from the TSS to address the spill over problem. It is important that the package finish be subjected to proper and adequate heat treatment without having a residue left thereon.

It will be appreciated that low fill levels are required for juices, especially those which are highly viscous or have a relatively high solids content. When compared with flood filling approaches, heat loss is higher for low fill level approaches. The combination of low fill level with a smaller container itself creates a problem of how to achieve proper heat treatment without using excessive heating which can damage the juice or damage or misshape the package finish area which typically contains threads for receiving a cap. The container bell and top sealing surface can experience excessive shrinkage if subjected to too high a temperature for too long a time.

In a hot filling line, it is important that the heated food product be in contact with the inside of the container, including the package finish area, for a time adequate to ensure sterilization. When the container being filled is of a larger volume than those under consideration here, the latent heat of such a larger volume of beverage ensures that the elevated temperature will be maintained for a time adequate to ensure that microbial issues are properly addressed. Somewhat similarly, when the container or bottle being filled has a thickness such that it provides a good thermal barrier, that thermal barrier will be counted upon to be adequate to maintain the heat as required for good manufacturing practices.

In fact, when a bottle has a relatively small volume, resistance to bottle deformation at a higher filling temperature intuitively should be addressed by providing a thicker wall. However, a thicker wall means that more material is needed for each bottle, thereby increasing cost. Increased wall thickness for a small bottle of 12 fluid ounces or less is particularly cost inefficient. These relatively high costs due to a thick-walled container have been found to be so costly on a unit basis that such small volume beverages would have to be sold at prices which are too high to be competitive.

Another problem which has come to be appreciated in developing this invention relates to polymer materials. A polymer which is often advantageous for beverage bottles is polyethylene terephthalate (PET). Another popular polymer for these types of products is high density polyethylene. Polymers such as these, and particularly PET, tend to be heat sensitive in the face of high temperatures for extended time periods. PET, for example, has a tendency to start to crystallize and flow under such conditions. Such considerations further suggest a thicker wall is desirable when the polymer has properties which, after being molded into a bottle, can change negatively upon exposure to temperatures above normal acidic beverage hot fill temperatures, which is the case for PET, for example.

Heretofore it has been suggested that hot water baths, hot water sprays, and/or steam sprays could be beneficial in addressing those situations where a relatively small latent heat of the hot filled food and its combination with preferred thin polymer wall thickness are not adequate to maintain the proper elevated temperature for the needed length of time in order to ensure all microbial issues have been fully and adequately handled. The invention realizes that these types of liquid or water based heat application systems bring with them their own problems for small polymeric bottles. Such applications are unsatisfactory for a variety of reasons. Hot water/steam presents a clean-up problem and can be a potential source of contamination. Also, having a hot spray impinge upon relatively small and delicate bodies potentially causes bottle damage. In addition, these types of sprays provide inconsistent heat transfer depending upon varied spray projections with respect to different bottles in the line. For example, different sides of the bottles typically encounter different quantities of water impinging the bottles at different angles. Also, changes in spray rate, angle or pressure will cause inconsistencies and the potential for bottle damage, breach of capped bottle integrity, or inadequate heat application.

These various approaches do not address all of the problems which have arisen by the present attempts to have a stream of relatively small bottles be hot filled and maintained at an adequate temperature throughout the interior of the bottle for a dwell time and temperature which are adequate to ensure sufficient application of heat and resulting control of microbial development upon shelf storage. There is accordingly a need for an approach which is more effective than those currently available in the processing of hot filled beverages in small containers, especially beverages having substantial quantities of citrus juice.

SUMMARY OF THE INVENTION

In accordance with the present invention, juice beverages are filled into a plurality of polymeric containers having a small filling capacity intended primarily for serving uses. At filling, the thus hot-filled containers have a selected hot filled temperature, followed by capping and inverting (when practiced). They are subjected to a post-filling heat dwell, during which the hot-filled temperature of the beverage does not drop below said selected hot filled temperature by more than about 4° F. (about 2.2° C.). This post-filling heat dwell continues for at least about 30 seconds and until the containers have been subjected to adequate heat so as to assure microbial stability for extended ambient temperature shelf storage.

A general object of the present invention is to provide an improved method and system for filling juice beverages.

Anther object of the present invention is to provide an improved method and system which fills juice beverages into small volume polymeric containers by taking measures to assure microbiological control in such containers.

Anther object of this invention is to provide an improved method and system relating to the filling of juice beverages into small containers and taking measures to have them undergo sufficient post-filling heat dwell while permitting thin-walled construction of the containers.

Another object of this invention is to provide an improved process and system by which low-volume containers, after hot-filling, are maintained at a selected heat filling temperature for an extended time without a substantial reduction in the heat filling temperature during this time period.

Another object of the present invention is to provide an improved process and system by which low-volume containers are filled with juice beverages and are properly heat treated despite the relatively low BTU's associated with the lower volume of hot filled juice which gives off relatively low levels of radiant heat and cools off at a rate which, without the invention, is not adequate to achieve proper heat treatment of the beverage and of the entirety of the container, including its package finish area.

Other objects and advantageousness of the present invention will be understood from the follow description according to preferred embodiments of the present invention, relevant information concerning which is shown in the accompanying drawings.

BRIEF DESCRIPTION OF THE DRAWINGS

FIG. 1 is a schematic illustration of the system and method of a preferred embodiment of the invention.

FIG. 2 is a cross-section along the line 2—2 of FIG. 1, illustrating the preferred warming tunnel.

FIG. 3 is a side elevational view of the warming tunnel, illustrating a viewing window.

DESCRIPTION OF THE PREFERRED EMBODIMENTS

The drawings provide an illustration of a system which is suitable for carrying out the process in accordance with the invention. Also shown schematically are some of the typical processing stations either upstream or downstream of the conveyor warming tunnel 11. Upstream thereof are illustrated each of a filling station 12, a capping station 13, and a cooling station 14.

Filling station 12 is shown as a conveyorized unit having a filling nozzle 15 which charges a selected beverage volume or weight into a polymer bottle 16. The beverage is metered into the bottle while the beverage is at an elevated temperature. This is accomplished in accordance with hot filling equipment and techniques which are well known in the container filling art. At this stage, the beverage contents contact the inside bottle surfaces are at a so-called hot filling temperature.

Promptly thereafter a cap 17 is applied onto the hot filled bottle, such as at capping station 13. Capping equipment and technology for accomplishing this task are well known in the art.

With the filled and capped bottle at a temperature very close to the hot filling temperature, the filled and capped bottle typically moves to a station which inverts the bottle to be sure all inside surface are contacted by the hot contents, such as the illustrated inverter station 20. Inverter equipment and technology for accomplishing this task are well known in the art. The bottles then move into the conveyer warming tunnel 11.

It will be appreciated that, in commercial operations, multiple bottles are thus processed in a very short time period. A typical high speed line in this regard processes between about 250 and 750 bottles per minute. The conveyer warming tunnel is designed to accommodate these types of bottle flows. In essence, multiple hot filled and capped bottles enter in a continuous flow through the entrance opening 19 of the tunnel 11, are maintained at close to the hot filling temperature, and leave the conveyer warming tunnel 11 through an exit opening 21 of the conveyer warming tunnel.

Thereafter, bottle cooling is effected or permitted, depending upon the needs for the particular product being bottled. The cooling details also can depend on equipment available at and downstream of the cooling station or system 14. In a typical situation, the bottles will be cooled to on the order of 100° F. (about 38° C.).

With more particular reference to the conveyer warming tunnel 11 which is illustrated as a preferred embodiment for extended time temperature control, FIG. 2 and FIG. 3 show a particular structure which is suitable in this regard. Included is a conveyor assembly 22 by which hot filled and capped bottles 18 (FIG. 1) are moved through the conveyor warming tunnel. A plenum 23 provides a passageway for heated air or gas supply through the inlet 24. The plenum 23 is defined by an insulated wall 25 and an interface plate 26. A return path, including outlet 30, is provided for the air or other gas.

The interface plate 26 is selected to provide laminar flow of heated gas, typically air, out of the plenum and into the heat treatment chamber 27 of the conveyor warming tunnel 11. This heat treatment chamber may include insulated walls 28 sized to minimize heat loss therethrough. An access door 29 may be provided on either or both longitudinal walls of the tunnel 11. A viewing access location such as the window 31 provides the ability for viewing the inside of the tunnel during operation.

Referring more particularly to the interface plate 26, this may take the form of a perforated plate. The plate 26 deflects heated gas or air flow through the inlet 24 in order to diffuse the hot gas or air flow as it enters the heat treatment chamber 27. The diffused heated gas is not forcefully directed onto the bottles; instead, the heated gas diffuses or moves in a laminar fashion into the heat treatment volume within the tunnel assembly 11. The tunnel assembly thereby provides uniform heat application and minimizes uneven flow and channeling of heated air which would negatively impact upon the small bottles flowing rapidly through the conveyer warming tunnel. The heated gas or air envelopes each hot filled and capped container 18 as it is conveyed through the tunnel. This provides a clean and sanitary means of providing a warm environment around the bottles in order to thereby unobtrusively reduce heat loss out of the hot filled and capped bottles 18 while they are within the tunnel.

Concerning the bottle 18, this is made of a polymer. In most instances, the polymer will be a commonly available one which is relatively inexpensive. Examples include PET and high density polyethylene. Generally PET is an advantageous material for use in making containers, including small sized bottles of the type involved herein. In many instances, multiple-layered polymer materials are used. For example, a barrier layer can be beneficially included in order to lessen oxygen transfer through the polymer walls. For polymers that are susceptible to damage by aggressive heating media such as steam or hot water spray, this laminar heated air envelopment of the bottles is especially well-suited to provide the heat profile required by the invention without doing so in a way which has the potential to damage the bottles.

In accordance with the invention, the wall thickness of the polymeric containers is minimized so as to reduce materials cost. Wall thicknesses of bottles according to the invention can be between about 22 and 25 gram weight, such as when the bottles are primarily PET. If PET bottles of this thickness were subjected to rigorous application of heat, such as steam or hot sprayed water, damage of such thin-walled bottles would be likely. However, the process and system according to the invention allows for safe use of such thin-walled bottles. Under the circumstances and conditions specified herein, including maintenance of a temperature of 172° F. (78° C.) for up to or in excess of three minutes, bottle damages is avoided.

The bottles 18 have a filling capacity 12 oz. or less. Typical bottle sizes are 10 ounces, 8 ounces and other similar or smaller sizes. These bottles tend to be tall and narrow, rather than short and squat. Their height is substantially greater than their width. Typically the height is at least twice the width, often at least thrice the width. Bottles of this type have a relatively high surface-to-volume ratio, which makes the rate of cooling of such bottles more rapid, given the same rate of heat differential between the bottle and its environment. If the rate of cooling is too rapid, a risk is run that the hot-filled and capped bottle will have its shape and/or finish deformed.

It is important that the small bottles each be maintained in a warming tunnel environment having air or other gas which is at a temperature of at least about 120° F. (about 49° C.) for a length of a time sufficient to achieve adequate heat treatment. For small and thin-walled bottles of the present type, the air or gas temperature should not exceed about 160° F. (about 71° C.). Typical maximum treatment times are about 3 minutes, this being the duration that each bottle remains in the warming tunnel. Tunnel heated air temperatures typically are between about 130° F. and about 150° F. (about 54° C. to about 66° C.). Usually at least about 30 seconds, and typically at least about 45 seconds of time in the tunnel is required to achieve the objectives of the invention. Preferably, the temperature of the contents within each bottle while within the warming tunnel will be between about 172° F. and about 182° F. (about 78° C. to about 83° C.), depending largely upon the temperature of hot filling. A typical duration within the warming tunnel is between about 1 minute and about 2 minutes.

The juice beverages which are filled into the low-volume containers include citrus juices and other juices such as apple juice beverages and grape juice beverages. Such beverages typically will be of a high solids type, such as ones having a juice content of at least about 30 weight percent, based upon the total weight of the beverage. The invention is especially advantageously used for juice beverages which are 100 percent juice. The invention is suitable for successfully filling into the low-volume containers juice beverages which are 100 percent citrus juice, such as 100 percent orange juice or 100 percent juice blends having primary quantities of citrus juice or juices.

Studies were undertaken in order to evaluate the effects of warming tunnel technology in the context of the present invention.

EXAMPLE 1

Bottles having a 10 ounce filling capacity were hot filled with "from concentrate" whole orange juice. The bottles were made from PET having a gas barrier inner layer. The PET was provided at 24 gram weight. The temperature of the beverage within the bottle at the capping station was at a mean value of 181.7° F. (83° C.). These bottles were transported through a 90°—90° inverter and to a conventional cooling tunnel, the transfer taking approximately 150 to 155 seconds. The temperature of the beverage within the bottle at the entrance to this cooling tunnel was determined. The mean value for this temperature measurement was 177° F. Accordingly, the temperature loss in this filling apparatus which is typically safely and successfully used for bottles having a larger fluid capacity was 4.8° F. (about 2.7° C.) for these 10 oz. bottles.

Bottles of the same type and containing the same beverage were hot filled and capped. The mean measured temperature at the capper was 181° F. The bottles were conveyed through the inverter and through a warming tunnel as shown in FIG. 1, FIG. 2 and FIG. 3. At the cooling tunnel entrance, the mean measured temperature of the juice within the bottle was 178.4° F. (about 81° C.), representing a decrease of 2.8° F. (about 1.5° C.) through the warming tunnel. The dwell time between the capper and the cooling tunnel and within the warming tunnel is about 100 seconds, with the time in the inverter being about 10 seconds. This was a substantially smaller reduction in temperature loss, namely a 41.7% reduction in mean temperature loss. This indicated that a substantially greater amount of heat was available for sterilization treatment, but without requiring a higher hot fill temperature. A hot fill temperature much higher than that of this Example deforms bottles of this small size. Usually deformation occurs at about 185° F. (85°).

EXAMPLE 2

Several 10-ounce PET in bottles of the type generally noted in Example 1 were hot filled at 181° F. (83° C.). One grouping of these bottles was subjected to filling, capping, inverting, holding and entrance into a cooling tunnel using procedures for bottles of larger capacity, such as 16 fluid ounces or larger. This provided a dwell time between capping and entrance into the cooling tunnel of 60 seconds, with about 10 seconds being in the inverter. Another series of the same style and size of bottles filled with the same type of beverage were treated in the same manner, except a warming tunnel as shown in FIG. 2 and FIG. 3 was used. The different processing of these 10 oz. bottles gave the following result. The bottles processed through the use of the warming tunnel had an average temperate which was 5° F. (about 2.8° C.) higher than those bottles which were not subjected to passage through the warming tunnel. The time in the inverter after capping was about 10 seconds, and the time in the warming tunnel was about 50 seconds.

EXAMPLE 3

Bottles are processed with a warming tunnel in accordance with Example 1. The bottles having 10 fluid ounces of beverage at their filling capacity are hot filled at 185° F. (85° C.). They are subjected to a warming tunnel providing a heated air environment at 140° F. (60° C.) for 45 seconds. Adequate treatment is practiced, and bottle deformation and damage is avoided.

EXAMPLE 4

Bottles are processed with a warming tunnel in accordance with Example 1. The bottles having 10 fluid ounces of beverage at their filling capacity are hot filled at 183° F. (84° C.). They are subjected to a warming tunnel providing a heated air environment at 150° F. (65.5° C.) for 60 seconds. Adequate treatment is practiced, and bottle deformation and damage is avoided.

EXAMPLE 5

Hot filling of 10-ounce PET containers of reconstituted from concentrate orange juice proceeded during testing without a warming tunnel as described herein. Products from this line were put into shelf storage after the line had been shut down and restarted. They showed development of mold. Other products filled on this line but maintained to not fall below about 178° F. (about 82° C.) show no such mold development after extended shelf storage.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A process for filling juice beverages into containers, comprising:
    providing a plurality of polymeric containers having a filling capacity of not more than about 12 fluid ounces;
    filling said plurality of containers with hot juice beverage to provide a flow of hot filled containers of juice beverage at a selected hot filled temperature;
    subjecting the hot filled containers to a post-filling heat dwell period during which the temperature of the beverage is less than said selected hot filled temperature by not more than about 4° F. (about 2.2° C.), said post-filling heat dwell including having the hot filled containers in an environment heated by circulating hot air or gas for between about 45 seconds and about 3 minutes; and
    thereafter allowing said hot filled containers of juice beverage to cool to a temperature below said selected hot filling temperature.

2. The process in accordance with claim 1, wherein said selected hot filled temperature is between about 175° F. and about 185° F. (about 80° C. and about 85° C.).

3. The process in accordance with claim 1, wherein said post-filling heat dwell period is for between about 1 minute and about 2 minutes.

4. The process in accordance with claim 1, wherein said plurality of polymeric containers have a film weight of between about 22 and about 25 grams.

5. The process in accordance with claim 4, wherein the providing selects polymeric containers of PET or of high density polyethylene.

6. The process in accordance with claim 1, wherein the temperature of said post-filling heat dwell period is between about 120° F. and about 160° F. (between about 49° C. and about 71° C.).

7. The process in accordance with claim 1, wherein the polymeric containers have a filling capacity of not more than about 10 fluid ounces.

8. The process in accordance with claim 1, wherein the temperature of said beverage after said post-filling heat dwell period is not greater than about 3° F. (about 1.7° C.) lower than said selected hot filled temperature.

9. The process in accordance with claim 1, wherein said subjecting of the hot filled containers to a post-filling heat dwell period includes conveying the flow of hot-filled containers of juice beverage through a tunnel which is closed on at least four sides, and the heated environment is hot air heat at a temperature of between about 130° F. and about 150° F. (between about 54.50 and about 66° C.).

10. The process in accordance with claim 1, wherein said providing of containers provides PET containers having a weight of between about 22 and about 25 grams and having a height greater than its width.

11. The process in accordance with claim 1, wherein said filling fills hot citrus beverage which is 100 percent juice.

12. The process in accordance with claim 1, wherein said filling leaves a fill level of the juice beverage spaced away from the top sealing surface of each said container and wherein said post-filling heat dwell period effects adequate heat treatment of the finish area including the top sealing surface.

13. A process for filling juice beverages into container, comprising:
    providing a plurality of polymeric containers having a filling capacity of not more than about 10 fluid ounces;

filling said plurality of containers with hot juice beverage to provide a flow of hot filled containers of juice beverage at a selected hot filled temperature; subjecting the hot filled containers to a post-filling heat dwell period at a temperature of at least about 120° F. (about 49° C.), during which the temperature of the beverage is less than said selected hot filled temperature by not more than about 4.8° F. (about 2.7° C.) for between about 30 seconds and about 3 minutes;

thereafter allowing said hot filled containers of juice beverage to cool to a temperature below said selected hot filling temperature; and wherein said subjecting of the hot filled containers to a post-filling heat dwell period includes conveying the flow of hot-filled containers of juice beverage through a tunnel which is closed on at least four sides and subjecting the hot-filled containers to hot air heat.

14. The process in accordance with claim 13, wherein said providing hot air heat provides hot air heat at a temperature of between about 130° F. (54.5° C.) in about 150° F. (66° C.).

15. The process in accordance with claim 13, wherein said selected hot filled temperature is between about 175° F. and about 185° F. (about 80° C. and about 85° C.).

16. The process in accordance with claim 13, wherein the temperature of said beverage after said post-filling heat dwell period is not greater than 4.0° F. (about 2.2° C.) lower than said selected hot filled temperature.

* * * * *